Figure 7:
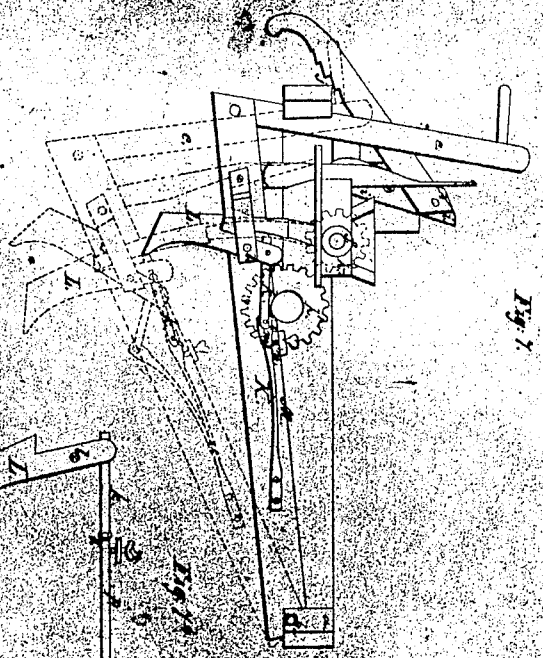
Figure 7A:
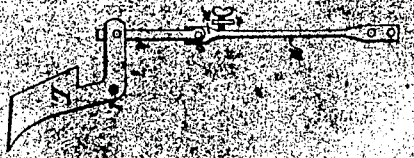
Figure 7B:
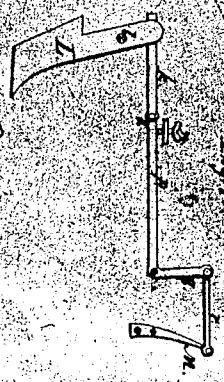
Figure 6:
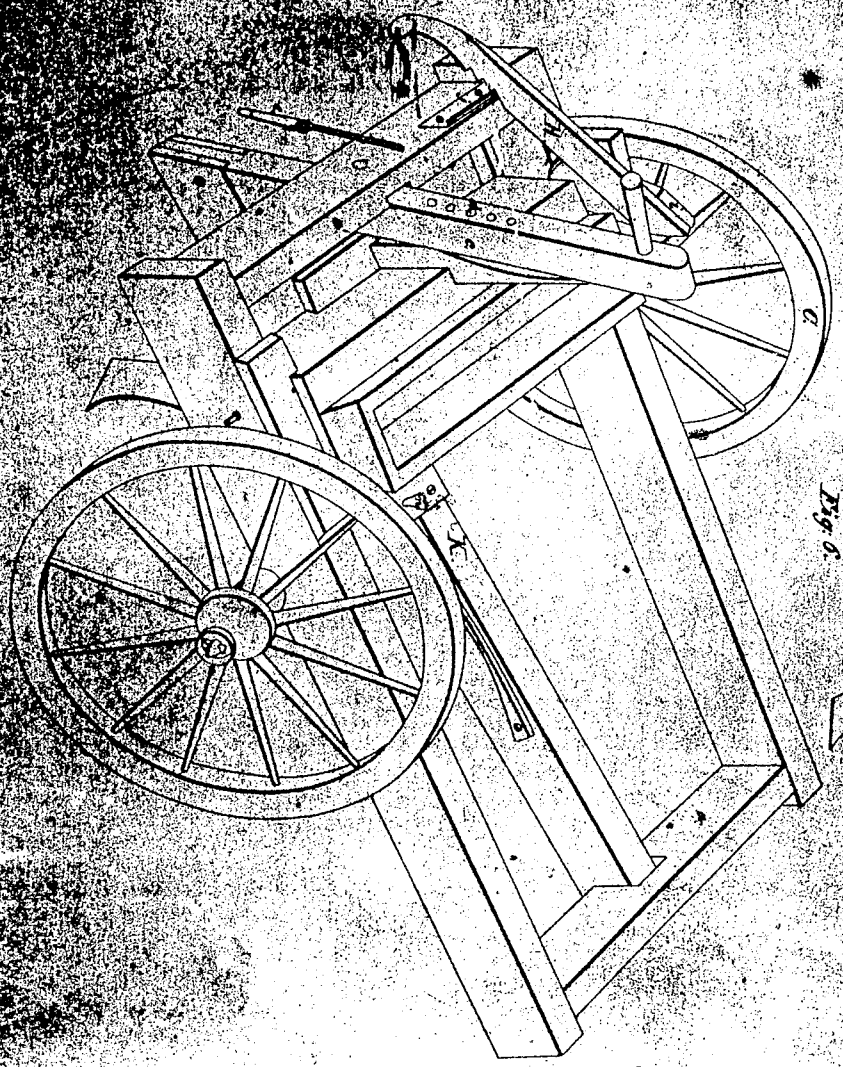

DLY.

J. D. WILLOUGHBY

Grain Drill.

No. 91

A. I. Patented Nov. 20 1849.